United States Patent
Pasquet et al.

(10) Patent No.: US 6,938,965 B2
(45) Date of Patent: Sep. 6, 2005

(54) VEHICLE HYDRAULIC BRAKING SYSTEM WITH AN ACTIVE SIMULATOR

(75) Inventors: Thierry Pasquet, Livry Gargan (FR); Werner Quirant, Bleistein (FR)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 10/469,615

(22) PCT Filed: Dec. 19, 2001

(86) PCT No.: PCT/FR01/04063
§ 371 (c)(1),
(2), (4) Date: Sep. 4, 2003

(87) PCT Pub. No.: WO02/053436
PCT Pub. Date: Jul. 11, 2002

(65) Prior Publication Data
US 2004/0075336 A1 Apr. 22, 2004

(51) Int. Cl.[7] .............................................. B60T 8/142
(52) U.S. Cl. .................. 303/115.4; 303/10; 303/113.4; 303/116.1; 303/119.1
(58) Field of Search ............................... 303/90, 116.1, 303/116.2, 113.4, 115.4, 117.1, 155, 10, 119.1

(56) References Cited

U.S. PATENT DOCUMENTS

| | | | | |
|---|---|---|---|---|
| 4,523,792 A | * | 6/1985 | Belart et al. ............. | 303/122.1 |
| 4,750,788 A | * | 6/1988 | Seibert et al. ........... | 303/113.2 |
| 4,869,560 A | * | 9/1989 | Nishii ...................... | 303/114.1 |
| 4,957,330 A | * | 9/1990 | Morikawa et al. ....... | 303/115.4 |
| 5,061,016 A | * | 10/1991 | Hirobe ..................... | 303/114.1 |
| 5,215,359 A | * | 6/1993 | Burgdorf et al. ......... | 303/115.4 |
| 5,261,730 A | * | 11/1993 | Steiner et al. ........... | 303/113.4 |
| 5,911,484 A | * | 6/1999 | Hashida ................... | 303/115.4 |
| 6,126,248 A | * | 10/2000 | Kawahata et al. ....... | 303/114.1 |
| 6,517,170 B1 | * | 2/2003 | Hofsaess et al. .............. | 303/11 |

* cited by examiner

*Primary Examiner*—Matthew C. Graham
*Assistant Examiner*—Mariano Sy
(74) *Attorney, Agent, or Firm*—Leo H. McCormick, Jr.; Warren Comstock

(57) ABSTRACT

A hydraulic braking apparatus for a motor vehicle having a service braking system (A) fed by a central hydraulic unit (3) and an emergency braking system (B). A simulator (M) resists a forward motion of an actuator member (D, 16) for a master cylinder (17) to define a reaction corresponding to the progress of a braking operation. Admission solenoid values (9a–9d) and exhaust solenoid values (14a–14d) connected to the wheel brakes (2a–2d) modulate pressurized fluid supplied by a central hydraulic unit (3) in effecting the braking operation. Sensors (8, 13a–13d, 24, 29) in the motor vehicle detect various braking parameters that are communicated to a computer (C) to control the solenoid valves (9a–9d; 14a–14d) such that the braking operation is a function of the travel of the actuator member (D, 16).

9 Claims, 2 Drawing Sheets

VEHICLE HYDRAULIC BRAKING SYSTEM WITH AN ACTIVE SIMULATOR

BACKGROUND OF THE INVENTION

This invention relates to a hydraulic braking apparatus of the type comprising, for the actuation of the wheel brakes:

a service braking system, supplied with a pressure brake fluid by a central hydraulic unit, using an external energy source;

an emergency braking system, controlled by muscular energy;

a hand-control member, the forward travel of which actuates the service braking system or, in the case of a failure of the latter, the emergency braking system;

A master cylinder having at least one primary piston, the stroke of which is controlled by the hand-control member;

at least one safety valve, capable either of separating the master cylinder from the wheel brakes when the service braking system operates properly or, should the service braking system fail to operate correctly, of connecting the master cylinder with at least one wheel brake;

a feeling simulator, intended to resist the forward motion of the hand-control member with a reaction corresponding to the progress of a braking operation, such simulator comprising a cylinder in which a simulator piston may slide while being subjected, in one direction, to a fluid pressure from the master cylinder and, in the opposite direction, to a counterforce dependent on the travel of the hand-control member;

pressure-fluid admission solenoid valves and exhaust solenoid valves, connected to the wheel brakes;

sensors for the detection of various braking parameters, in particular the travel of the hand-control member, and the pressures at various spots of the apparatus;

and a computer, connected to the various sensors and capable of controlling the solenoid valves so as to obtain the desired pressures in the wheel brakes.

A braking apparatus of said type is known, for instance, from FR 2 772 706 or from U.S. Pat. No. 5,544,948.

In such an apparatus, in the course of a trouble-free operation in the service braking mode, the master cylinder is isolated and the fluid, contained in the master cylinder, cannot flow back to the wheel brakes. The hand-control member, e.g. a brake pedal or a hand-brake lever, retains a normal actuating travel, dependent on the exerted force, thanks to the feeling simulator, which comprises a cylinder connected to the master cylinder for the fluid transfers.

The well-known apparatuses operate satisfactorily and, besides, they make it possible to lay down a law of variation for the force to be applied to the hand-control member as a function of the travel, which may give the driver a feeling like that he would get if the pressure inside the wheel brakes resulted directly from the pressure supplied by the master cylinder, and from the muscular force exerted on the brake pedal.

Yet, in these apparatuses known per se, the law of variation concerning the force to be applied to the hand-control member is somewhat fixed, and it cannot be altered in a simple and rapid manner.

Now then, on various grounds, more especially depending on the type of the motor vehicle concerned, it is most desirable that said law of variation should be alterable as simply and as rapidly as possible.

Besides, it is most desirable that the simulator should consume as little fluid as possible, so that the emergency braking, achieved with the help of the master cylinder, may remain as efficient as possible.

BRIEF SUMMARY OF THE INVENTION

Therefore, the primary object of the present invention is to provide a hydraulic braking apparatus, which meets the various above-mentioned requirements better still than currently and which, more particularly, makes it possible to alter, in an easy and rapid manner, the law of variation for the force to be applied to the hand-control member, as a function of the travel.

Moreover, it is to be desired that the solution, as it is provided herein, be implemented in a comparatively simple and especially reliable way.

According to the invention, a hydraulic braking apparatus for a motor vehicle, of the above-defined kind, is characterised in that the counterforce within the simulator results from the action, on a surface of the simulator piston, of a modulated pressure, which comes from the fluid pressure supplied by the central hydraulic unit and is controlled by the computer in accordance with a determined law, alterable ad lib, as a function of the pedal travel.

Any law of variation whatever, as regards the force exerted on the hand-control member as a function of the travel, may be programmed in the computer, without having to modify the apparatus in another way.

Preferably, the surface of the simulator piston, which is under the modulated pressure, defines a variable-capacity chamber connected in parallel to an admission solenoid valve, for the pressure fluid supplied by the central hydraulic unit, and to an exhaust solenoid valve, connected to the feed tank, the opening and closing of said solenoid valves being controlled by the computer so that the pressure inside the simulator chamber may follow the desired law.

In a preferred manner, the solenoid valves, connected to the simulator chamber, are of the "on/off" type and the pressure drop between the inlets and the outlets of the solenoid valves may be linear dependently on the control current strength.

Advantageously, in the simulator, the counterforce is the resultant of a resilient force acting upon the simulator piston in the opposite direction to the fluid pressure coming from the master cylinder, and of a variable force resisting the resilient force, such variable force being generated by the modulated pressure acting on a surface of the simulator piston.

The resilient force may be produced by at least one resilient return means. In a preferred manner, such resilient return means comprises an air spring.

The cylinder of the simulator may comprise two intercommunicating coaxial bores with different diameters, and a stepped piston including a small-diameter portion sliding in a leak proof manner inside the small-diameter bore, and a greater-diameter portion sliding in a leak proof manner in the large-diameter bore, the end wall of the small-diameter bore comprising a port connected to the master cylinder for the fluid pressure from the master cylinder to be applied to the small cross-section of the stepped piston, whereas an annular chamber is defined between the transition wall of the bore and the large cross-section of the stepped piston, such annular chamber being connected in parallel to the respective admission and exhaust solenoid valves.

The end wall of the simulator cylinder, which closes the large cross-section bore in the opposite direction to the small cross-section bore, may comprise an opening for the passage of a rod resting on the large cross-section of the stepped piston and exerting the resilient force on said piston. Such rod may be integral with a pneumatic piston sliding inside a pneumatic cylinder, for its part integral with the simulator cylinder, such pneumatic cylinder being connected to an external air-pressure source, intended e.g. for a pneumatic suspension.

A nonreturn valve may be provided on a pressure-air line connected to the pneumatic cylinder, such valve allowing the inflow of the pressure air into the cylinder and opposing its outflow.

A mechanical compression spring may be arranged inside the pneumatic cylinder to as to act upon the pneumatic piston in the same direction as the air pressure.

In addition to the above-mentioned arrangements, the invention provides a number of arrangements as well, which will be more fully explained in the following detailed description of an embodiment of the present invention, by way of example and by no means as a limitation, when taken in conjunction with the accompanying drawings.

DETAILED DESCRIPTION OF THE INVENTION

Figure 1:
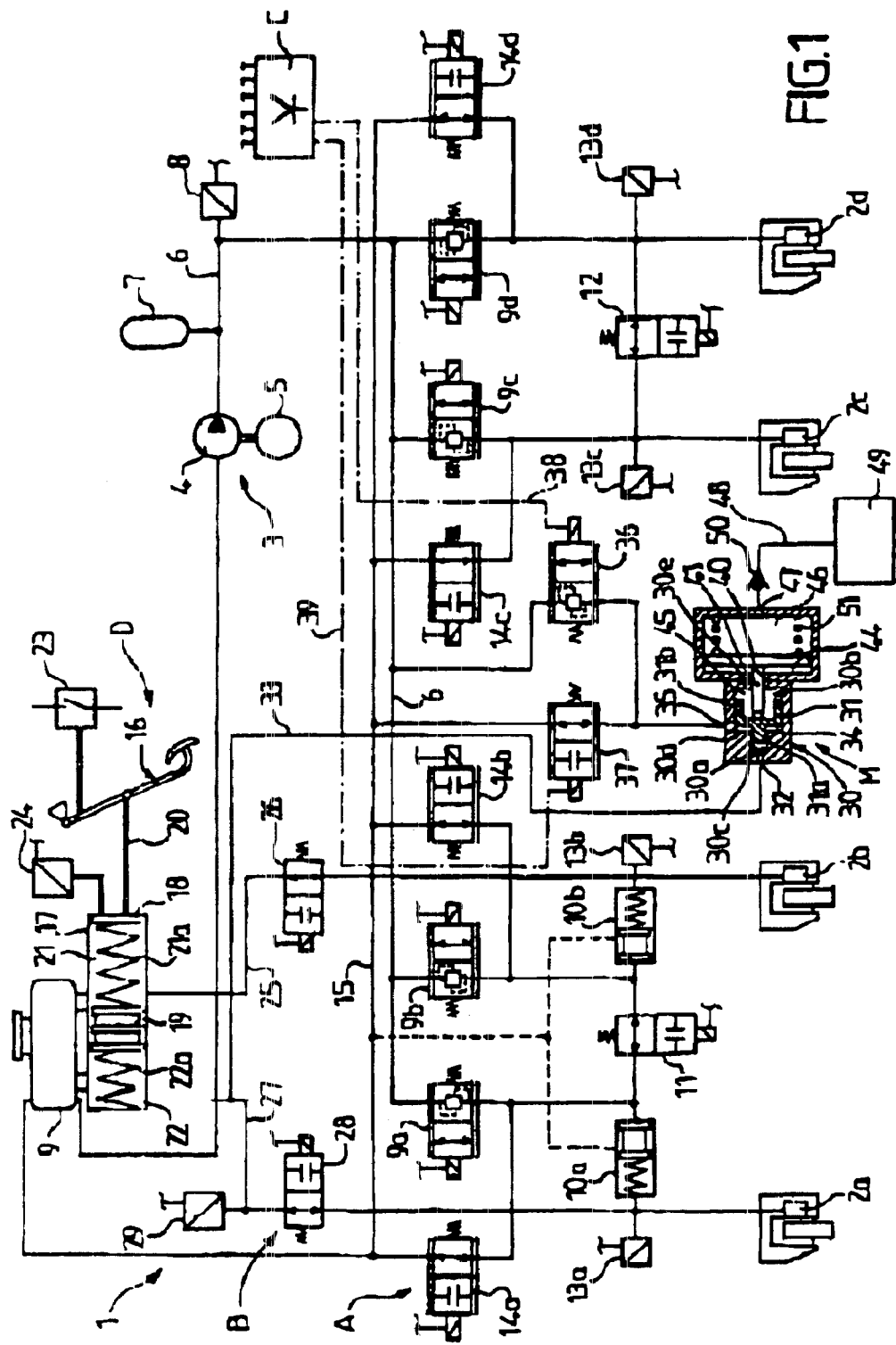
FIG. 1 is a schematic illustration of a hydraulic braking apparatus according to the present invention.

FIG. 1 shows a hydraulic braking apparatus 1 intended for a motor vehicle and devised to actuate the wheel brakes 2a and 2b for the front wheels, and 2c and 2d for the rear wheels. In a conventional manner, each wheel brake comprises a cylinder in which a piston is capable of moving under the action of a pressure fluid, so as to apply a brake pad or shoe against an element, either a disk or a drum, rotationally locked with the wheel to be braked.

The apparatus 1 comprises a service braking system A, supplied with a pressure fluid by a central hydraulic unit 3, using an external energy source, and an emergency braking system B, controlled by muscular energy.

The central hydraulic unit 3 comprises a pump 4 driven by a motor 4, e.g. an electric motor. The pump 4 delivers pressure fluid to a main supply line 6, on which a hydropneumatic accumulator 7 is mounted. A pressure sensor 8, which outputs an electrical quantity indicative of the pressure value in the line 6, is also fitted on said line. The inlet side of the pump 4 is connected to a nonpressure fluid tank 9, also called a feed tank.

The pressure fluid line 6 is connected in parallel, through solenoid valves, 9a, 9b, 9c and 9d, to the respective wheel brakes 2a–2d. Such solenoid valves are two-position ones, i.e. they are either open or closed, and they are pilot-controlled by means of a programmable computer, or microprocessor C. For a better and clearer understanding of the drawings, the electrical connections between the control coils of the solenoid valves and the computer C are represented by the beginning of a line only.

In the rest position, the valves 9a–9d are closed, as shown in FIG. 1. The outlet of a valve 9a, 9b is connected to a front wheel brake 2a, 2b through a hydraulic separator, 10a and 10b respectively. The outlets of the valves 9c and 9d are directly connected to the rear wheel brakes 2c, 2d. A pressure-equalizing valve 11 is intercalated between the outlets of the valves 9a and 9b, and another pressure-equalizing valve 12 is intercalated between the outlets of the valves 9c, 9d as well.

A pressure sensor 13a, 13b, 13c, 13d is fitted on each supply line for the brakes 2a–2d so as to output an electrical quantity representative of the applied pressure. The outputs of these sensors 13a–13d are connected by lines (not shown) to the computer C. The output of the sensor 8 is also connected to C.

The exhaust solenoid valves 14a, 14b, 14c and 14d are connected in parallel to the admission solenoid valves 9a–9d, on the lines which are connected to the inlets to the wheel brakes. Said valves 14a–14d are two-position ones, i.e. either an open or a closed position, and they are connected to a line 15 returning the fluid to the feed tank 9. At rest, the valves 14a–14d are open, as shown in FIG. 1.

The exhaust valves 14a–14d are also pilot-controlled by the computer C, which comprises outputs connected to each coil controlling the valves 14a–14d.

The apparatus comprises a hand-control member D, generally consisting of a brake pedal 16 and a master cylinder 17, in which a primary piston 18 and a secondary piston 19 may slide, both of them having the same cross-section S1. The pedal 16 is connected to the piston 18 by a rod 20, linked to the pedal. Herein, a "forward travel or motion" designated a motion of the pedal 16 towards the master cylinder 17, which brings about a travel of the piston 18 towards the secondary piston 19 and the opposite end wall of the cylinder 17.

A primary chamber 21, filled with fluid, is defined between the piston 18 and the piston 19, and a spring 21a is disposed in said chamber between both pistons. A second chamber 22, filled with fluid too, is defined between the piston 19 and the end wall of the master cylinder 17, remote from the piston 18. A spring 22a is arranged in the chamber 22.

An electric contact 23, sensitive to the forward travel of the pedal 16, is provided in a conventional manner for the control of the "stop" lights. A terminal of this contact 23 is connected to a terminal of the computer C, which actuates the service braking system A in response to the forward travel of the brake pedal 16. Besides, a stroke sensor 24 for the pedal 16 is provided and it transmits a corresponding electrical signal to another input terminal of the computer C. For instance, the sensor 24 may output data concerning the amplitude of the travel of the pedal 16 as well as data regarding the travel speed.

Both chambers 21, 22 of the master cylinder are connected to the feed tank 9 through a nonreturn valve (not shown), which enables the chambers 21, 22 to be supplied with fluid but precludes a backflow.

The primary chamber 21 is connected with the wheel brake 2b, by means of a pipe 25 fitted with a safety or stop solenoid valve 26. The solenoid valve 26 is controlled by the computer C and it is of the two-position type, i.e. open or closed; it is in the open position when the apparatus is at rest.

The chamber 22 is connected to the wheel brake 2a through a line 27 and a solenoid valve 28. A pressure sensor 29 is fitted on the line 27, between the master cylinder 17 and the solenoid valve 28. The sensor 29 outputs an electrical signal, which is applied through a link (not shown) to an input of the computer C.

Besides, the braking apparatus 1 comprises a brake-actuation simulator M, intended to resist the forward motion of the brake pedal 16 with a reaction corresponding to the progress of a braking operation.

Such simulator M comprises a cylinder 30 (cf. FIGS. 1 and 2), in which a simulator piston 31 slides.

The cylinder 30 comprises two intercommunicating coaxial bores 30a, 30b with different diameters. The smaller-diameter bore 30a is bounded, in the opposite direction to the bore 30b, by a wall 30c in which a central port 32 is provided. Such port 32 is connected through a pipe 33 with one chamber of the master cylinder 17, in the present instance the secondary chamber 22.

The piston 31 is a stepped piston including a small-diameter portion 31a with a cross-section S2, sliding in a leak proof manner inside the bore 30a, and a greater-diameter portion 31b sliding in a leak proof manner in the bore 30b. The portion 31b is edged with a cylindrical skirt, the concave side of which is in the opposite direction to the bore 30a.

An annular chamber 34, with a cross-section S3, is formed between the portion 31b and the transition wall 30d situated between the bores 30a and 30b. Said annular chamber 34 surrounds the portion 31a, and its capacity varies as a function of the position of the piston 31 along the axis of the cylinder 30. A port 35 is provided in the wall of the cylinder 30 and it opens into the bore 30b, near the wall 30d, which is the end wall of the chamber 34.

The port 35 is connected in parallel (FIG. 1) to a pressure-fluid admission solenoid valve 36 and to an exhaust solenoid valve 37. The solenoid valves 36 and 37 are of the "on/off" type, which means that they have two positions and that they are either open or closed. Preferably, the pressure drop between the inlets and the outlets of the solenoid valves 36, 37 follows a linear variation, as a function of the control current strength for these valves. The control coils of the valves 36, 37 are connected by electrical lines 38 and 39 to two terminals of the computer C. The inlet of the valve 36 is connected to the pressure-fluid supply line 6 coming from the central hydraulic unit 3. The outlet of the valve 37 is connected to the fluid-return line 15 leading to the tank, or feed tank 9.

The computer C controls the valves 36 and 37 as a function of the travel of the pedal 16 so to obtain a modulated pressure Pehb, which is applied within the annular chamber 34 and exerted on the annular surface S3 of the piston 31.

The end wall 30e, closing the bore 30b in the opposite direction to the bore 30a, comprises an opening 40 for the passage of a rod 41, which is coaxial with the cylinder 30 and bears on the piston 31. The rod 41 is integral with a pneumatic piston 42 (i.e. a piston subjected to a gas pressure), disposed inside a cylinder 43 coaxial with the cylinder 30 and attached to the latter. Generally, the diameter of the piston 42 is greater than the diameter of the portion 31b of the piston 31. These diameters are determined so as to achieve the desired forces, while taking into account the pressures involved. The rod 41 traverses the end wall of the cylinder 43.

The chamber 44 of the cylinder 43, located on the rod 41 side, is connected to the atmosphere through at least one port, not visible in the drawings. In the same way, the chamber 45 in the bore 30b, which receives the rod 41, is connected to the atmosphere through at least one port, not visible on the drawings either.

In the opposite direction to the rod 41, the piston 42 has a cross-section S4 and it defines, inside the cylinder 43, a chamber 46 with the same cross-section S4. Such chamber 46 is connected, via a port 47 provided in the end wall remote from the cylinder 30, to a pipe 48, for its part connected to an external air pressure source 49. More particularly, the source 49 may be a compressed-air source for a pneumatic suspension. By way of a non-limiting example, the compressed-air pressure, supplied by the pipe 48, may be in the order of 10 bars.

A nonreturn valve 50 is provided on the pipe 48, near the port 47, so as to allow the inflow of the pressure air from the pipe 48 into the chamber 46 and to prevent an air flow in the reverse direction.

A compression spring 51 is arranged in the chamber 46, between the piston 42 and the end wall of the chamber, for an action in the same direction as the air pressure. Such spring 51 exerts on the piston 42 but a negligible return force, compared with the forces generated through the pressures.

Thus, in one direction, the piston 31 of the simulator is under the fluid pressure coming from the master cylinder 17 and exerted on the small portion 31a and, in the opposite direction, it is subjected to a counterforce, which depends on the travel of the pedal 16. Such counterforce is equal to the difference between the resilient force, applied by the piston 42 and transmitted through the rod 41, and the variable force, which is exerted by the modulated pressure Pehb on the cross-section S3 of the stepped piston 31.

The simulator M takes action when the service braking system operates in a trouble-free manner. Under those circumstances, the valves 28 and 26 are closed so that the fluid within the chamber 21 is confined in a constant volume; as a matter of fact, the pressure prevailing in said chamber 21 is the same as that existing in the chamber 22, connected to the pipe 33.

Figure 2:
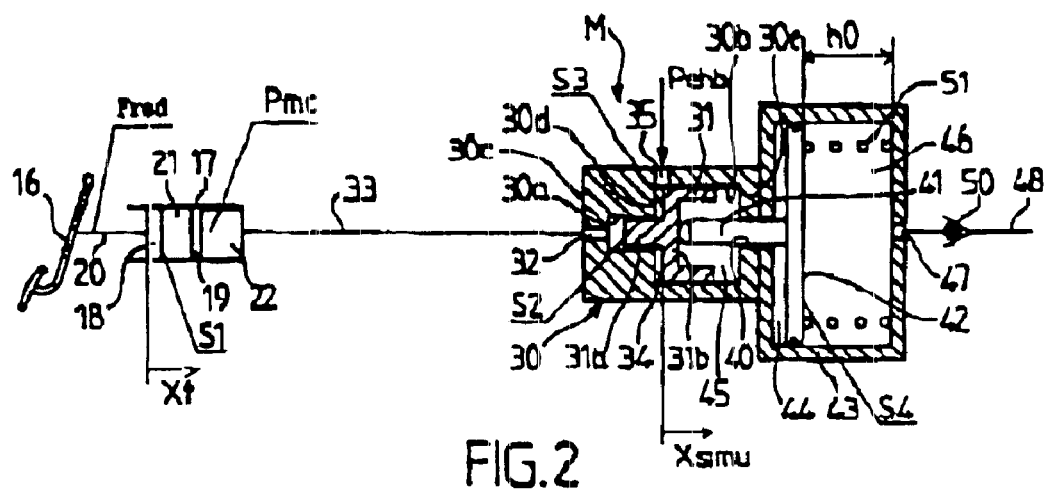
FIG. 2 is a simplified diagram on a larger scale of the simulator and of the master cylinder.

FIG. 2 is a simplified diagram, which makes it possible to lay down relationships between the various quantities. The various parameters are designated as follows:

Frod=force exerted by the pedal 16 on the rod 20
Pmc=pressure inside the master cylinder 17
S1=cross-section of the master cylinder 17
Xt=travel of the rod 20 and of the piston 18
S2=cross-section of the portion 31a
Xsimu=travel of the piston 31
S3=cross-section of the annular chamber 34
Pehb=modulated pressure at the port 35
S4=cross-section of the piston 42, on the chamber 46 side
P0=initial pressure in the chamber 46
V0=initial volume of the chamber 46
h0=initial axial length of the chamber 46.
In the absence of fluid leaks:
S1.Xt=S2.Xsimu, whence Xt=(S2/S1).Xsimu.

This being so, the mode of operation of the apparatus is as follows.

At rest, that is when the pedal 16 is not depressed, the various constitutive parts of the apparatus are in the positions illustrated in FIG. 1.

As soon as the pedal 16 is actuated, the contact 23 sends the computer C data indicating the beginning of a braking operation. The computer C causes the closure of the valves 26 and 28, thus separating the master cylinder 17 from the brakes 2a, 2b of the front wheels. Besides, the computer C controls the solenoid valves 9a–9d and 14a–14d so as to induce, in the wheel brakes 2a–2d, a pressure which is a function of the travel of the pedal 16, more particularly a function of the position and the travel speed of the latter. Other factors, e.g. the detection of a wheel locking may be taken into consideration by the computer C so as to act on the brake pressure.

Moreover, the computer C controls the valves 36, 37 in order to obtain, at the inlet 35, a modulated control pressure Pehb, which varies according to a predetermined law, as a function of the pedal travel.

Figure 3:
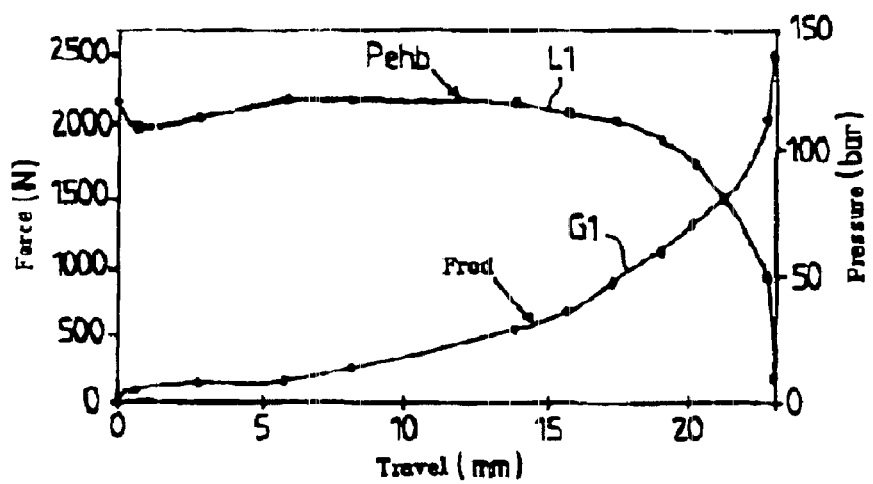
FIG. 3 illustrates an example of a law of variation for the force to be exerted on the hand-control member as a function of the travel, and of the modulated pressure.

The curve L1 represented in FIG. 3 is an example of a law of variation for the pressure Pehb, the values of which are indicated by the bar-graduated scale along the Y-axis on the right-hand side, as a function of the pedal travel expressed in millimeters along the X-axis.

When the piston 42 travels in the direction meaning an increased volume of the chamber 46, it is under an air pressure, equal to that supplied by the line 48. But, when the piston 42 moves in the direction resulting in a reduced capacity of the chamber 46, the valve 50 closes and the air volume confined inside the chamber 46 undergoes a compression process, such a compression being generally considered as adiabatic, so that the air pressure rises in the chamber 46.

The force, exerted by the pressure Pehb on the cross-section S3 of the piston 31, is subtracted from the force applied by the piston 42. The pressure Pmc of the master cylinder, applied to the cross-section S2 of the portion 31*a*, balances such difference. Said pressure Pmc, applied to the piston 18 of the master cylinder, generates the reaction, resisting the forward travel of the pedal 16.

The pressure inside the chamber 46 being designated by Px, for an axial length (h0–Xt) of this chamber, the expression may read:

$$Prod = Pmc.S2 = (Px.S4) - (Pehb.S3)$$

and the various quantities may be inferred from the relationship existing between the pressure Px and the volume of the air mass confined in the chamber 46.

The variation of the force Ft to be exerted on the rod 20 as a function of the travel of such rod is illustrated by the curve G1 in FIG. 3, the values of the force Ft being indicated by the newton-graduated scale along the Y-axis, on the left-hand side.

The law L1 controlling the pressure Pehb may be altered ad lib, through a programming of the computer C. It means that the curve G1 may be altered ad lib too, without having to modify the equipment for all that.

At the beginning of the travel of the pedal 16, the force to be exerted on the rod 20 should not be too high, with the result that the pressure Pehb is comparatively high in the case of short travels, so as to reduce the force to be exerted on the pedal 16.

The more the pedal 16 is depressed, the more the chamber 22 feeds fluid to the bore 30*a*. The piston 31 travels towards the cylinder 43 while pushing back the rod 41 and the piston 42. The volume of air, confined inside the chamber 46, exerts an increasing pressure, which results in a greater force to be applied to the rod 20. The pressure Pehb is decreasing from a certain value of the travel of the pedal 16 onwards, so that the resistance to the forward travel may be great enough towards the end of the travel.

At that time, the driver actually "feels" the level of the braking force applied by an external energy source, irrespective of his muscular effort.

Figure 4:
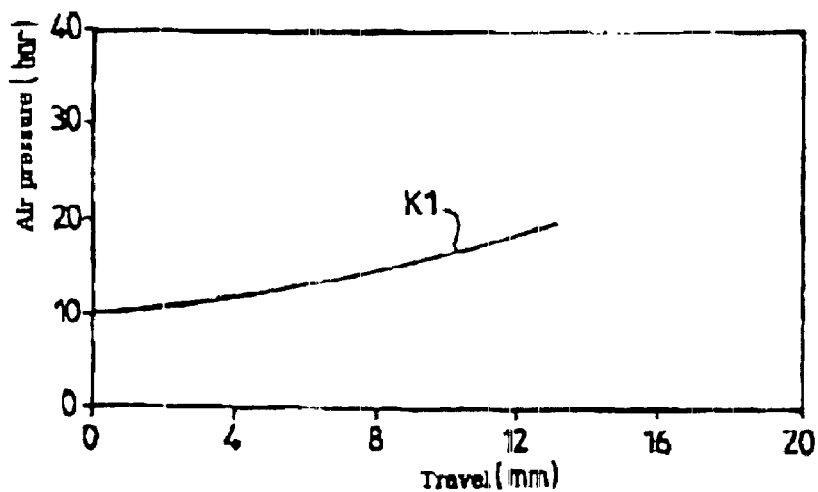
FIG. 4 shows the variation of the air pressure inside the pneumatic cylinder as a function of the piston stroke.

FIG. 4 shows in a curve K1 the variation of the air pressure Px (in the chamber 46) expressed in bars along the Y-axis, as a function of the piston 42 travel expressed in millimeters along the X-axis.

Should some trouble happen in the service braking system, the calculator C would detect this failure, e.g. on the basis of too low a pressure value, output by the sensors 13*a*–13*d*, though the pedal 16 has moved.

As a consequence of it, the computer C keeps the valves 26, 28 in their open positions, with the result that pressure fluid, coming from the master cylinder 17, may flow via two independent circuits towards the brakes 2*a* and 2*b*, thus making it possible to carry out an emergency braking operation.

Moreover, the fluid contained in the bore 30*a* is driven under the action of the piston 42 still under the air pressure, and a pressure, substantially higher than that prevailing inside the chamber 22 of the master cylinder, is produced in the bore 30*a*. Therefore, the piston 31 is pushed back, to the left-hand side in FIG. 1, and it discharges some fluid into the line 27 supplying the brake 2*a*, the effect of it being that the braking requirements are met still better.

As a matter of fact, in the presence of a failure in the service braking system, the emergency braking system, based on the muscular energy, must enable the driver to apply the brakes with a sufficient deceleration which is, for the time being, fixed at to 0.3 g, in response to a determined force, e.g. 500 newtons (500 N), exerted on the brake pedal 16. Owing to the fact that the fluid volume, coming from the bore 30*a* of the simulator, is recovered for the emergency braking, such an emergency braking operation can be ensured even in the case of a comparatively heavy motor vehicle, e.g. in the order of 4,000 kg.

What is claimed is:

1. A hydraulic braking apparatus for actuating wheel brakes of a motor vehicle, comprising:

a service braking system (A), supplied with a pressure brake fluid by a central hydraulic unit (3), using an external energy source;

an emergency braking system (B), controlled by muscular energy;

a hand-control member (D, 16), the forward travel of which actuates the service braking system and in the case of a failure of the service braking system, the emergency braking system;

a master cylinder (17) having at least one primary piston (18), the stroke of which is controlled by the hand-control member (D, 16);

at least one safety valve (26, 28) for separating the master cylinder (17) from the wheel brakes (2*a*, 2*b*) when the service braking system operates properly and should the service braking system fail to operate correctly for connecting the master cylinder with at least one wheel brake;

a feeling simulator (M) for resisting the forward motion of the hand-control member (D, 16) with a reaction corresponding to the progress of a braking operation, said simulator comprising a cylinder (30) in which a simulator piston (31) slides while being subjected, in one direction, to a fluid pressure coming from the master cylinder (17) and in the opposite direction, when subjected to a counterforce corresponding to a predetermined travel of said hand-control member (D, 16);

pressure-fluid admission solenoid valves (9*a*–9*d*) and exhaust solenoid valves (14*a*–14*d*), connected to the wheel brakes;

sensors (8, 13*a*–13*d*, 24, 29) for the detection of various braking parameters including the travel of the hand-control member (D, 16), and the pressures at various spots of the apparatus;

and a computer (C), connected to the various sensors and for controlling said solenoid valves to obtain desired pressures in said wheel brakes, characterised in that said counterforce within the simulator (M) results from the action on a surface (S3) of said simulator piston (31) of a modulated pressure (Pehb) received from the fluid pressure supplied by the central hydraulic unit (3) and is controlled by the computer (C) in accordance with a determined law (L1), alterable ad lib as a function of the travel of said hand-control member (D, 16); and in that said surface (S3) of said simulator piston receives the modulated pressure (Pehb) communicated to a variable-capacity chamber (34) within said cylinder (30) that is connected in parallel to an admission solenoid valve (36), for the pressure fluid supplied by the central hydraulic unit (3), and to an exhaust solenoid valve (37), connected to a feed tank (9), the opening and closing of said solenoid valves (36, 37) being controlled by the computer (C) so that the pressure (Pehb) inside the variable-capacity chamber (34) follows said determined law (L1) and in that said solenoid valves (36, 37) are connected to said variable-capacity chamber (34) of said simulator (M) that is either on or off; and in that a pressure drop between an inlet and an outlet of said solenoid valves (36, 37) is linear dependently on a control current strength.

2. The apparatus according to claim 1, characterised in that said cylinder (30) of said simulator (M) comprises a small diameter bore (30a) separated from a coaxial large diameter bore (30b) by a transition wall (30d) and a simulator piston (31) including a small-diameter portion (31a) that slides in a leakproof manner inside said small-diameter bore (30a), and a greater-diameter portion (31b) that slides in a leakproof manner in said large diameter bore (30b), said small diameter bore (30a) having an end wall (30c) with a port (32) connected to the master cylinder for the fluid pressure from the master cylinder (17) that is applied to a small cross-section (S2) of the simulator piston (31), said transition wall (30d), large diameter bore (30b) and greater-diameter portion (31b) of said piston defining an annular chamber (34) that is connected in parallel to said respective admission and exhaust solenoid valves (36, 37).

3. The apparatus according to claim 2, characterised in that, in the simulator (M), a counterforce is the resultant of a resilient force acting upon said simulator piston (31) in an opposite direction to fluid pressure coming from the master cylinder (17), and of a variable force resisting the resilient force, said variable force being generated by a modulated pressure (Pehb) acting on a surface (S3) of said simulator piston 31.

4. The apparatus according to claim 3, characterised in that a resilient force is produced by at least one resilient return means.

5. The apparatus according to claim 4, characterised in that said resilient return means comprises an air spring (42, 43).

6. The apparatus according to claim 3, characterised in that an end wall (30e) of the simulator cylinder (30), which closes the large diameter bore (30b) in an opposite direction to said small diameter bore (30a) has an opening (40) for the passage of a rod (41) that engages a large cross-section (31b) of the simulator piston (31) to exert a resilient force on said piston (31).

7. The apparatus according to claim 6, characterised in that said rod (41) may be integral with a pneumatic piston (42) that slides inside a pneumatic cylinder (43) that is an integral part of the simulator cylinder (30), said pneumatic cylinder (43) being connected to an external air-pressure source (49) for pneumatic suspension.

8. The apparatus according to claim 7, further characterised by a nonreturn valve (50) that is provided on a pressure-air line (48) that is connected to the pneumatic cylinder (43), said valve (50) allowing the inflow of pressure air into the pneumatic cylinder (43) while opposing outflow of air.

9. The apparatus according to claim 8, further characterised by a mechanical compression spring (51) that is arranged inside the pneumatic cylinder (43) to act upon the pneumatic piston (42) in a same direction as pressurized air.

* * * * *